Figure 1:
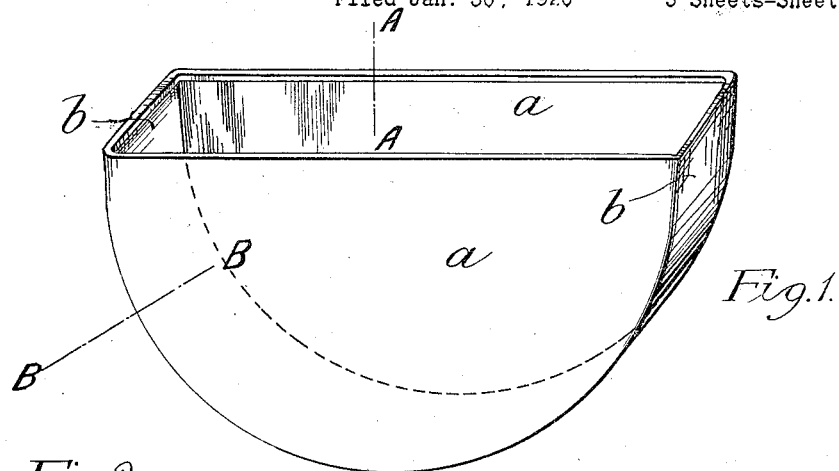

June 10, 1924.

H. E. SCRUTTON

PERAMBULATOR AND OTHER VEHICLE

Filed Jan. 30, 1920     3 Sheets-Sheet 1

1,497,247

Inventor.
Hubert E. Scrutton
By Julian C. Dowell
his attorney

June 10, 1924.
H. E. SCRUTTON
PERAMBULATOR AND OTHER VEHICLE
Filed Jan. 30, 1920      3 Sheets-Sheet 2
1,497,247
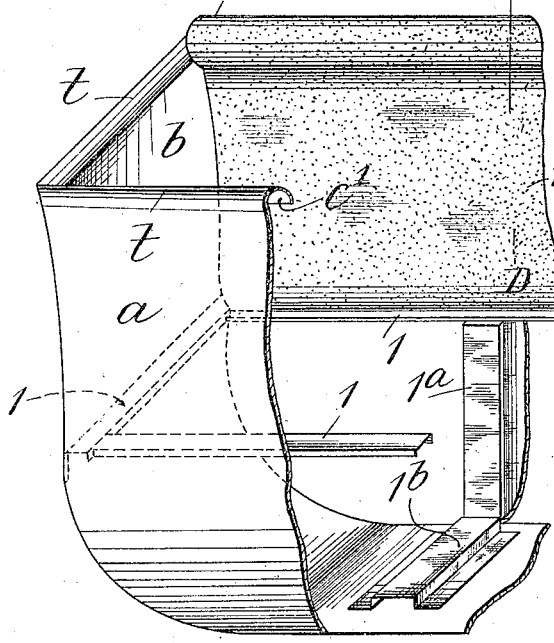
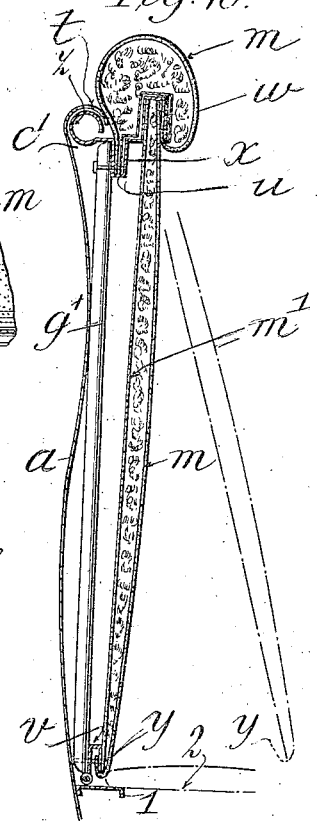
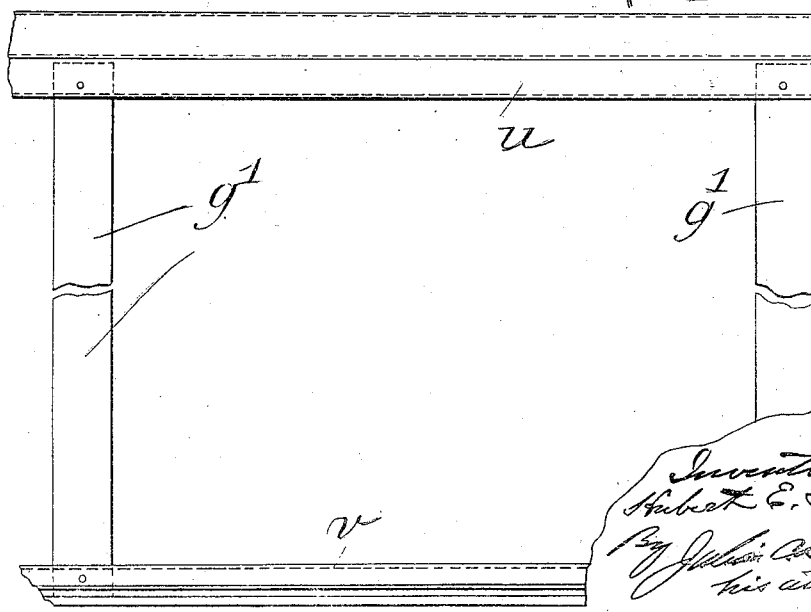

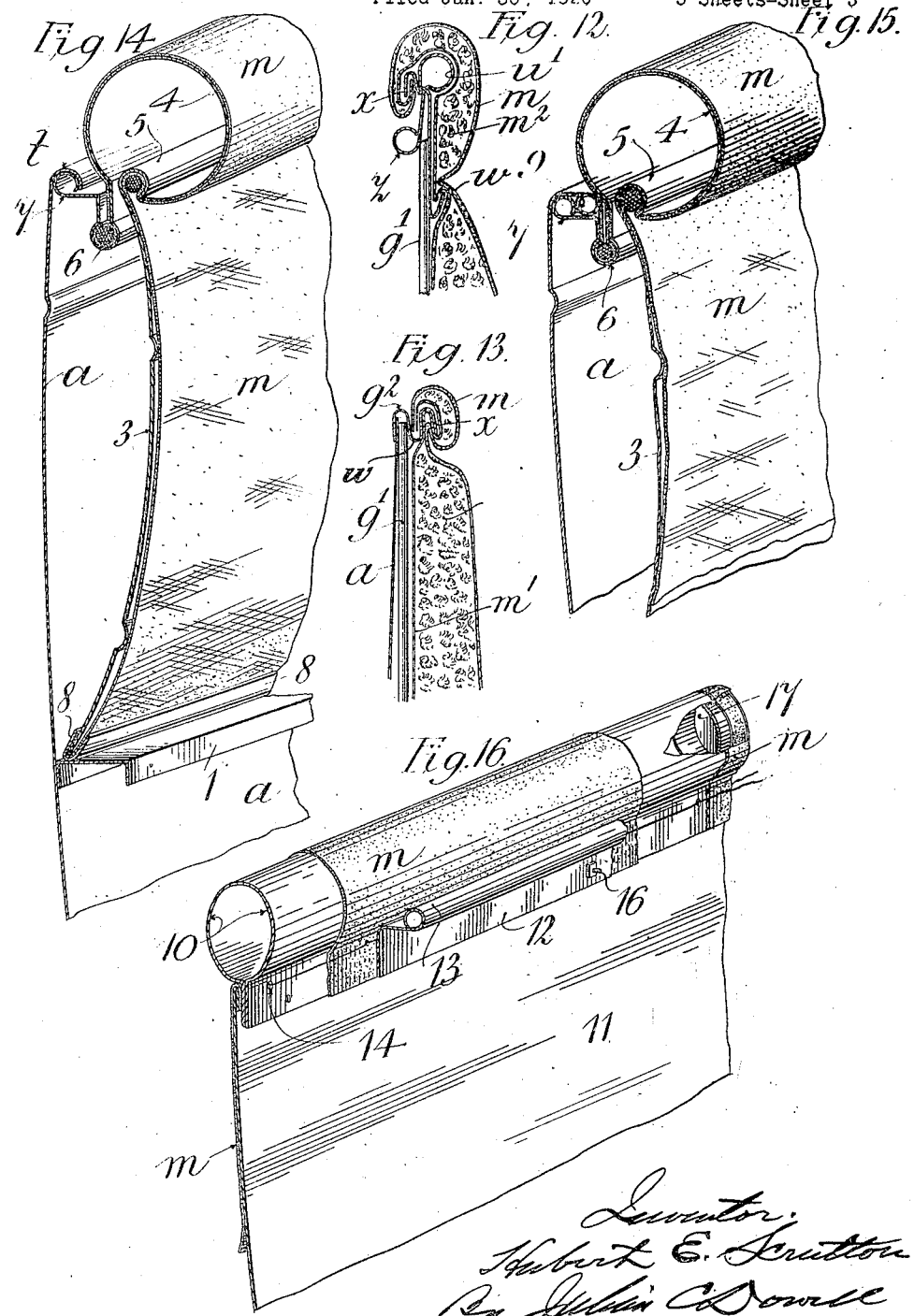

Patented June 10, 1924.

1,497,247

UNITED STATES PATENT OFFICE.

HUBERT EUGENE SCRUTTON, OF CATFORD, ENGLAND.

PERAMBULATOR AND OTHER VEHICLE.

Application filed January 30, 1920. Serial No. 355,100.

*To all whom it may concern:*

Be it known that I, HUBERT EUGENE SCRUTTON, a subject of the King of Great Britain and Ireland, residing at Catford, in the county of Kent, England, have invented Improvements in or Relating to Perambulators and Other Vehicles, of which the following is a specification.

This invention relates to perambulators, push cars and baby carriages generally, and other vehicles in which in order to facilitate interchangeability of upholstery, simplification of manufacture, and cleaning of the upholstery and other parts of the vehicle, the upholstery is attached to one or more frames that is or are adapted to be placed in position in the vehicle for use and removed therefrom as and when desired.

The present invention has for its object to enable the upholstery material to be secured in a more advantageous manner to the frame or frames than heretofore, to admit of the upholstered frame or frames being inserted in place and held in position in the body of the vehicle and of being removed therefrom, in an easier and more advantageous manner than usual and to provide a vehicle body of improved construction for use with such upholstered frames.

For these purposes the frame, or each frame, to be upholstered is adapted at its upper and lower end portions to admit of the upholstery material being readily clamp, clinched or held in place and at its upper end portion is provided with a lateral extension or enlarged part adapted to be supported or held in position by the upper end portion of the body of the vehicle.

The body of the vehicle, particularly in the case of a perambulator or like vehicle, may be in one piece of sheet metal formed to shape, as by stamping, or in two or more pieces of sheet metal, as for example when the body is of approximately semi-cylindrical or other dished shape, but, particularly where internal or external flanges, lugs and the like are required, the body may be built up of a number of pieces of sheet metal. The upper portions of the body of the vehicle may be especially adapted to support or engage the upper portions of the upholstered frame or frames to hold the latter in position for use. For this purpose the upper portion of the body may be enlarged as by providing it with inwardly or outwardly extending flanged portions designed to carry or to receive the lateral extension or enlarged part of the upper portion or portions of the frame or frames. Or, the upholstered frame or frames may be adapted to engage with and be carried by an upper plain edge portion of the body.

Figure 3:
Figure 4:
Figure 5:
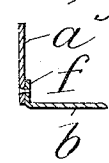
Figure 6:
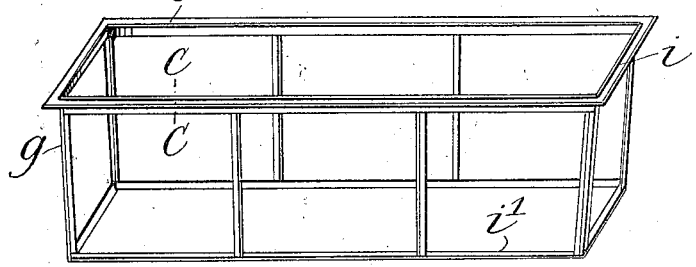
Figure 8:
Figure 7:
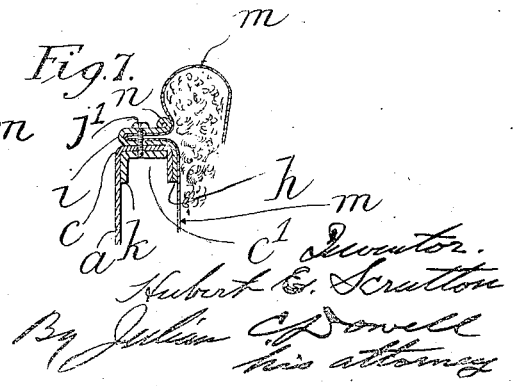

In order however that the invention may be better understood it will now be further described with reference to the accompanying drawings whereof Fig. 1 is a perspective view of a body, substantially semi-cylindrical in shape of a vehicle, for example a perambulator, Figs. 2 and 3 being detail sections corresponding respectively to the lines A A and B B of Fig. 1. Figs. 4 and 5 are views similar to Fig. 3 of modified forms of joint. Fig. 6 is a perspective view of an upholstery frame suitable for the body shown in Fig. 1, and Fig. 7 is a sectional view of one of the upper members of such frame and the adjacent portion of the body of the vehicle and corresponding to the line C C of Fig. 6. Fig. 8 is a view similar to Fig. 7 of a modified construction. Fig. 9 is a perspective view of a portion of another form of body adapted to be upholstered in another way, and Fig. 10 is a section on the line D D of Fig. 9 of one portion of such a body and an upholstered frame therefor. Fig. 11 is a view of a portion of the frame alone. Fig. 12 is a similar view to Fig. 10 showing another modification. Figs. 13, 14, 15 and 16 show further modified arrangements.

Figure 2:
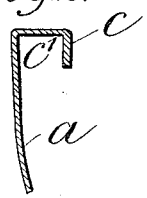

Referring first to Figs. 1 and 2, the body of the vehicle comprises two semi-circular or equivalently shaped sides $a$, $a$ and a semi-cylindrical or equivalently shaped uniting portion $b$, constituting the bottom and ends, the several members being formed with a flange $c$ that extends both inwardly and downwardly producing a concealed channel $c^1$. The several members of such a body may have square or curved meeting edges and any well known or suitable method of jointing them together may be employed, such as providing the edges with interlocking regions and soldering the joint to produce a flush surface, brazing, butt welding, riveting and the like. Thus, in Figs. 1 and 3, the edges are square, formed with an interlock $d$ and soldered. In Fig. 4 the edges are curved and butt welded at $e$, whilst in Fig. 5 the edges are square, overlap, are riveted at $f$ and finally soldered. Each side member $a$ of the body and also it may be, the bottom and end member $b$ thereof, may be dished, recessed or equivalently shaped at a part or parts thereof to form one or more panels of any desired shape, or one or more corrugations or equivalent, with a view to imparting some desired effect of ornamentation, or to impart greater strength, to the member, or for both of these reasons.

The upholstery for such a body may be carried by a frame $g$ as shown in Fig. 6 the upper members of which have a flanged marginal edge $i$, shown more clearly in Fig. 7, adapted to rest upon the flanged part $c$ of the body $a$ and to be secured thereto, if necessary, by screws $j^1$ passing through the flanges $c$ $i$ and adapted to be received by nuts or angle pieces $k$ appropriately screw-threaded and soldered or otherwise fastened in the concealed channel $c^1$. The flanged margin $i$ of the frame may, as shown, be formed by suitably creasing or folding a relatively narrow length of sheet metal longitudinally so as to form at the same time a housing for the reception of the edge portion of the upholstering materials $m$, $m^1$ and between the parts of which the said edge portions can be subsequently clinched or clamped together, there being say a bead $n$ at the upper edge of the housing and a flange $h$ at the lower edge, so that the whole frame has a finished appearance and can be held snugly in position upon the body $a$ $b$ of the vehicle. The lower edge portions of the upholstering materials $m$, $m^1$ are similarly clamped in the lower flanged margin $i$ of the frame $g$.

As an alternative to the foregoing, the upholstery frame may, as shown in Fig. 8, comprise upper members having an outer margin $p$ curved in cross section and adapted to receive the enlarged edge of say the lining $m^1$ and outer covering $m$ after these have been assembled and sewn together as at $r$ around a cord $s$ or the like, such cord or equivalent and the materials being firmly secured in the channel formed by mechanically closing the metal of the curved margin $p$ around them. The upholstery $m$, $m^1$ in this case obscures the framing entirely, the material $m$ resting directly upon the upper flanged portion $c$ of the body $a$ of the perambulator, or being supported at a distance beyond the same upon an outwardly extending flanged portion of the body of the vehicle so as to constitute an over-hanging padded edge. It will be obvious that in lieu of such a frame member, a tube slit longitudinally might be employed, the corded or equivalently beaded edge of the upholstery being slipped endwise into the tube.

As another modification, in lieu of a single upholstery frame, each region to be padded may be provided with a separate frame adapted to be supported in any of the ways hereinbefore described.

An example of this kind is shown in Figs. 9, 10 and 11 where the concealed marginal channel $c^1$ at the upper edge of the body $a$, $b$ is formed by curving inwards the edge portion $t$. Each side $a$, as well as each end of the body part $b$, is provided with a separate frame $g^1$ the upper and lower members $u$, $v$ of which, formed of sheet metal, are of the section shown in Fig. 10, the upholstery materials $m$, $m^1$ being secured with a clamping or clinching action at the grooved portions $w$ and $x$ of the upper member $u$ and in the grooved portion $y$ of the lower member $v$. The upper frame member $u$ has a lateral extension in the form of a roll edge $z$ which stands sufficiently far from the frame proper to enable it to be interlocked with the concealed channel $c^1$ formed by the edge $t$, the engagement and disengagement being easily effected by an angular movement of the frame $g$, as will be understood from Fig. 10, in which one of the end upholstered side frames $g^1$ is indicated in dot and dash lines as ready for removal.

One or each of the upholstered end frames for the perambulator may be extended upward to a greater height than the side frames in order to form a head or back rest. In this case, the upper member $u$ of the frame may be shaped and be of the relatively greater dimensions shown in Fig. 12, to form the clamping or clinching portions $w$ and $x$ for the edge portions of the upholstering materials $m$, $m^1$, a roll edge $z$ for engagement with the curved edge $t$ of the end portion $b$ of the body of the perambulator and with a rounded upper tubular portion $u^1$ around which the upholstering material $m$, $m^1$ and padding $m^2$ extend. The lower clamping or clinching member for the upholstering material may be similar to that shown at the lower end of the frame in Fig. 10.

The various frames rest at their lower edges upon suitable supports, such as the ledges 1 (Figs. 9 and 10), adapted to carry removable seats, one of which occupies the position indicated in dot and dash lines at 2 in Fig. 10, in which position it locks the various side and end frames against movement until it is itself removed. The side ledges 1 are carried by vertical supports $1^a$ fixed to the sides of the body. The end ledges may be fixed to the ends of the portion $b$ of the body and to the side ledges. The vertical support $1^a$ may, as shown, be connected to cross members 1ᵇ fixed to the bottom of the vehicle body. By this construction, the body although formed of light sheet material is rendered very strong and rigid; and also it prevents or minimizes vibration in the body.

In some cases the upper edges of the side and end members $a$, $b$ and $c$ of the body of the vehicle may be left plain, that is to say, without flanges, and the upper end of each of the upholstered frames $g^1$ be provided, as shown in Fig. 13, with grooved metal portions $g^2$ adapted to fit over and rest upon the said plain upper edge portions of the body and with other grooved portions at $w$ and $x$ to receive and clamp the adjacent edge portions of the lining $m^1$ and covering material $m$ of the upholstery.

The seat or seats may either be incorporated in the removable upholstered frame (Fig. 6), or it or they may be separate therefrom and be permanently or removably secured to the body of the vehicle. A removable seat is shown at 2 in Fig. 10. The upholstery frame $g$ or frames $g$ in lieu of being of metal, which is preferred, may be of wood or other suitable material.

In Fig. 14, a holder consisting of single sheet of metal 3 is shown as formed with a roll 4, circular clinching or holding regions 5, 6 and a beaded edge 7, the material $m$, in addition to being secured in such regions as before described, or by pins or cores threaded through loops of the material and passed through the said holding portions 5 and 6, being attached to the lower edge of the sheet 3 of metal by a U shaped strip 8 of sheet metal. The beaded edge 7 is adapted to be received by a channel in the vehicle body as described with reference to Fig. 10. A direct modification of this arrangement is shown in Fig. 15 where the beaded edge 7 is received behind a beaded edge 9 upon the vehicle body. In Fig. 16 a roll is formed separately from a sheet metal holder 11 and a member 12 having a beaded edge 13, a sheet of upholstery material $m$ being first applied to the roll and secured by sewing through piercings at 14 in the flanges 15 of the roll, the holder 11, after it has been also covered with a sheet of upholstery material $m$, and the member 12, being secured to opposite sides of the roll flanges 15, as by bolts and nuts 16. A device such as a plug 17 may be inserted in each end of the roll 10 to neatly hold the edges of upholstery tucked in the latter.

Whilst the invention has been described as particularly applicable to perambulators, push cars and baby carriages generally, the same features of improvements may be applied to motor cars or motor cycle side cars.

What I claim is:—

1. In a vehicle, a bodily removable upholstered member comprising an upholstery carrier provided at its upper end portion with holding means comprising adjacent longitudinally extending portions spaced apart, upholstery sheet material held at its upper portion between said adjacent longitudinal portions of said holding means and means for securing the lower portion of the upholstery sheet material to the lower portion of said carrier, said holding means being provided with a longitudinally extending laterally projecting part, uncovered by upholstery material, adapted to cooperate with the adjacent upper edge portion of the body of the vehicle to hold the upper end portion of the upholstered member in position.

2. In a vehicle, a bodily removable upholstered member comprising an upholstery carrier, inner and outer longitudinally arranged grooved holding devices at the upper edge portion thereof, and a longitudinally grooved holding device at the lower edge thereof, upholstering material secured within said upper grooved holding devices and extending from one of them over and into the other and thence downward to the lower grooved holding device wherein it is secured and means extending outward from the outer upper grooved holding means whereby the upper portion of the carrier is supported by the upper side portion of the vehicle.

3. In a vehicle, an upholstery carrier having at its upper end portion a sheet metal upholstery holding device formed with a plurality of longitudinally extending channels intermediate of its opposite edges, upholstery extending into such channels and means for retaining the upholstery therein.

4. In a vehicle, an upholstery carrier having near one edge two channels separated by a roll shaped portion, upholstery extending into such channels and surrounding the roll portion and means for retaining the upholstery therein.

5. In a vehicle, an upholstery carrier having a beaded edge, and two channels, one adjacent to the beaded edge and separated from its companion by a roll shaped portion, upholstery extending into such channels and surrounding the roll region and means for retaining the upholstery in such channels.

6. For a vehicle, removable upholstery comprising a carrier formed of sheet metal comprising a convex body portion, grooved holding portions at its upper end portion, a head piece of roll shape located between said grooved holding portions, an outwardly extending upper portion for engagement with the upper portion of the body of a vehicle, grooved holding means at the lower part of the body portion of the carrier and upholstery material extending over the body and head portions and secured in place by the upper and lower securing means.

7. For a vehicle, removable upholstery comprising a metal carrier having body and head portions with grooved securing portions and lateral holding portion, and upholstery material extending over the body and head portions and held in position by the grooved securing means, substantially as hereinbefore described.

8. For a vehicle, a bodily removable upholstered member comprising a carrier provided at its upper end portion with a longitudinally extending convex head portion and at the outer side thereof, a longitudinally extending laterally projecting part adapted to co-operate with the adjacent upper edge portion of the body of the vehicle, upholstering material secured to the outer side of said head portion between the same and the said laterally projecting part, extending over the convex head portion and secured to the opposite side thereof and extending down over the inner side of said carrier and means for securing the lower edge of said upholstering material to the lower portion of said carrier.

9. For a vehicle, a bodily removable upholstered member comprising a carrier provided at its upper end portion with a longitudinally extending convex head portion, parallel longitudinally extending upholstery holding devices adjacent to the lower side of said convex head portion and at the outer side of said head portion a longitudinally extending laterally projecting part adapted to co-operate with the adjacent upper edge portion of the body of a vehicle, and upholstering material extending over the convex head portion, held in place within said holding devices and extending down over the inner side of said carrier and means for holding the downwardly extending portion of said upholstering means to the lower portion of said carrier.

10. For a vehicle having a body provided with a concealed channel at its upper end, a bodily removable upholstered member comprising a carrier provided at its upper end portion with a longitudinally extending convex head portion, parallel longitudinally extending upholstery holding devices adjacent to the lower side of said convex head portion and at the outer and inner sides respectively of the said head portion, a longitudinally extending laterally projecting part having a beaded edge adapted to engage with the said concealed channel of a vehicle body, upholstering material extending from the outer holding devices over the convex head portion to the inner holding devices and downward over the inner side of the carrier and means for securing the lower portion of said material to the lower portion of said carrier.

Signed at London, England, this 12th day of January 1920.

HUBERT EUGENE SCRUTTON.